United States Patent [19]

Umemoto et al.

[11] Patent Number: 4,464,499

[45] Date of Patent: Aug. 7, 1984

[54] WAX FOR LOW GLOSS RESIN EXTERIOR PARTS OF AN AUTOMOBILE

[75] Inventors: Yoshiro Umemoto, Nagoya; Tsugumi Sanmiya, Toyota; Mituo Kato, Kawana, all of Japan

[73] Assignees: Toyota Jidosha Kabushiki Kaisha, Toyota; Sanko Chemical Co., Ltd., Inazawa, both of Japan

[21] Appl. No.: 495,995

[22] Filed: May 19, 1983

[30] Foreign Application Priority Data

Jun. 23, 1982 [JP] Japan .................. 57-107974

[51] Int. Cl.$^3$ .............. C08K 5/09; C08L 91/06; C09G 1/08
[52] U.S. Cl. .................. 524/230; 524/228; 524/231; 524/322; 106/10; 106/271
[58] Field of Search .......... 106/10, 270, 271; 524/266, 267, 228, 230, 231, 322

[56] References Cited

U.S. PATENT DOCUMENTS

| 2,856,297 | 10/1958 | Green | 106/8 |
| 3,362,839 | 1/1968 | Weindel | 106/270 |
| 4,394,418 | 7/1983 | Temple | 524/322 |

FOREIGN PATENT DOCUMENTS 688573  6/1964  Canada ........................ 524/230

*Primary Examiner*—Theodore Morris
*Attorney, Agent, or Firm*—Oblon, Fisher, Spivak, McClelland & Maier

[57] ABSTRACT

A wax which is suitable for use on low gloss resin exterior parts of an automobile, which comprises a microcrystalline wax having a melting point of 50° to 100° C. and/or a paraffin wax having a melting point of 40° to 70° C., a fatty acid amide, an isoparaffin and/or normal paraffin solvent having a boiling point of 100° to 250° C. and dimethylsilicone.

12 Claims, No Drawings

WAX FOR LOW GLOSS RESIN EXTERIOR PARTS OF AN AUTOMOBILE

BACKGROUND OF THE INVENTION

1. Field of the Invention

The present invention relates to a car wax for use in the maintenance and care of exterior automobile parts made of a low gloss synthetic resin. More specifically, the invention relates to a non-color-toned car wax for use in the maintenance of low gloss synthetic resins such as polypropylene or polyurethane which is used in the manufacture of such exterior automobile components such as bumpers. These components differ from components which are made of steel and are coated with a synthetic material.

2. Description of the Prior Art

As prescribed in JIS-K 2236-1974 (Japan Industrial Standard), the conventional car-polishing waxes available for automobiles are used for cleaning and polishing the smoothly coated surfaces of automobile bodies. The maintenance or care of a smooth surface such as the surface of a steel exterior panel is accomplished by removing the degraded surface portion together with dirt to produce a fresh coating, and then forming a protecting film of wax thereon to restore a smooth surface to the panel. When the surface of a steel panel is waxed, the wax functions to smoothen the reflection of light on the surface of the panel or to smoothen the refraction of transmitted light near the surface. However, conventional waxes are not suitable for the maintenance of the finishes of low gloss synthetic resin substrates which have uneven, rather than smooth, surfaces. In the preparation of exterior automobile parts from a synthetic resin factors such as surface configuration, and gloss and color may be selected and changed more freely in comparison to parts formed from steel. A variety of finishing techniques may be used for the finishing of synthetic resin parts. For example, the resin exterior parts may be coated, colored in a variety of colors, or the surfaces of the parts may be finished flat or uneven. Accordingly, parts prepared from synthetic resins should be maintained and cared for by different techniques than those used for the maintenance of coated smooth surfaces. For instance, when a conventional car wax is used for the finishing of synthetic resin parts which do not have smooth surfaces, the surfaces of the parts become white because the wax fills in the depressions or pits of the uneven surfaces, thereby impairing the appearance and degrading the cleanliness and freshness of the synthetic resin part.

Conventionally, the problems involved in waxing the coat on a steel plate having high lustre have been avoided as follows:

(1) polishing is repeatedly carried out until the blur which is likely to deteriorate the lustre of the coat is diminished;

(2) the thickness of the wax film after polishing is from 10 mm$\mu$, to up to 30 mm$\mu$ at the thickest; and (3) the steel plate is designed for flat or even surfaces.

However, since uncoated resin exterior parts are textured in depths of tens of microns, and scratches are likely to be formed thereon, the wax will clog in depressed portions and adequate polishing will be impossible.

Coloration of uncoated resin exterior parts which have low gloss appearance owing to the textured finishing or which have not been subjected to a mirror surface finishing treatment is based on absorption and scattering of light on the surfaces of the parts. Accordingly, if color toning is carefully performed so that once the applied car wax has been dried, it has the same color as that of the substrate, disadvantages in the maintenance and care by the conventional wax will be eliminated.

The problem encountered in the maintenance and care of the above-mentioned low gloss resin exterior parts is that the dirt remaining in the depressed portions and the scratches impairs the appearance. From this viewpoint, a car wax having a color suitable for repairing, that is, to sufficiently hide the remaining dirt or scratches, but which does not cause the whitening after the coating, will be most effective for the maintenance and care of the low gloss resin exterior parts.

However, selection of a wax having a suitable color is difficult because the inherent color of the low glass resin becomes indistinguishable due to dirt, scratches in the resin, and deterioration of the resin. If a car wax having an unsuitable color is coated onto the surfaces of the resin parts, the same or similar disadvantages as described above in connection with an ordinary color wax will exist. Furthermore, in the case of resin exterior parts which have been subjected to a plurality of finishing treatments, a car wax to be applied to the portions having a high gloss because of the coating treatment or the like need not particularly be colored. Moreover, it is necessary to perform the troublesome operation of selectively applying an appropriately color-toned car wax to a low gloss portion while applying a non-color-toned car wax to a high gloss portion (coated portion).

The foregoing description illustrates that an ordinary car wax causing whitening is not suitable for use on resin exterior parts, while an appropriately color-toned car wax not causing whitening may be suitably used. However, the application range of such a car wax is restricted and improper application may cause problems.

A need therefore continues to exist for a wax formulation which may be applied satisfactorily to the surfaces of shaped synthetic resin objects.

SUMMARY OF THE INVENTION

Accordingly, it is an object of the present invention to provide a wax for universal use in the maintenance and care of exterior parts, particularly as used in automobiles such as bumpers, and exterior panels, which are made from low gloss synthetic resins. The wax of this invention diminishes troublesome selective applications due to different surface colors or states of the resin parts.

Another object of the present invention is to provide a non-color-toned car wax for use in the maintenance of low gloss synthetic resin exterior parts, wherein the wax causes neither whitening, because of loading on the surface of the exterior parts, nor impaired appearance.

Briefly, these objects and other objects of the present invention which will become more readily apparent may be attained by a wax composition for the maintenance and care of exterior parts made from a low gloss synthetic resin which comprises a microcrystalline wax having a melting point of 50° to 100° C. and/or paraffin wax having a melting point of 40° to 70° C., a fatty acid bisamide, an isoparaffin and/or normal paraffin solvent having a boiling point of from 100° to 250° C., and an arbitrary amount of dimethylsilicone. One of the specific features of the present invention is that the wax does not include a hard wax such as carnauba wax.

DETAILED DESCRIPTION OF THE PREFERRED EMBODIMENTS

Exterior parts formed from low gloss synthetic resins (hereinafter referred to as "resin parts") are expected to be used with greater frequency in the manufacture of automobiles. Hence, the wax composition of the present invention is very useful for the maintenance and care of automobile bodies.

Microcrystalline wax (microcrystalline paraffin wax), paraffin wax, fatty acid amide, isoparaffin or normal paraffin solvent and dimethylsilicone, used as the ingredients of the car wax according to the present invention, are each known as a component of a conventional car wax. In the present invention, a microcrystalline wax and/or paraffin wax having a low melting point is used as the main ingredient because neither wax whitens after coating, both have good adhesion to synthetic resin materials, neither are too hard and both have excellent weatherability. A hard wax such as carnauba wax is not used at all. When an emulsion type wax is prepared, water, a surfactant and a thickener are further added. In order to improve the coating properties and adhesion to the substrate, a fatty acid amide such as fatty acid methylene-bisamide, for example, oleylmethylenebisamide is added. In order to minimize attack of the solvent on the resin, a normal paraffin and/or isoparaffin solvent which are free of an aromatic solvent is used. When an emulsion type wax is prepared, an acidic wax having a high acid value may further be used.

Important factors which might be taken into consideration in the maintenance and care of resin parts are as follows:

(a) Dust and dirt are likely to be left in the depressions and on the peaks of the uneven surfaces of the resin parts, even after washing with water or the like, thereby impairing the appearance of the resin parts.

(b) Scratches which occur on resin parts appear as undesirable white marks on the surfaces of the resin parts, thereby reducing the freshness of the appearance of the parts.

Thus, improvements to the composition of the wax used to finish such parts are necessary in order to overcome these disadvantages, which are not observed when decorative steel and iron panels are waxed, and to provide a durable protective material for the coating of the resin surfaces.

To achieve the desired whitening resistance, water resistance and coating properties, the wax preferably comprises 30 to 15 parts (hereinafter "parts" means "parts by weight") of the microcrystalline wax and/or paraffin wax, 1 to 5 parts of the fatty acid amide, 60 to 90 parts of the isoparaffin or normal paraffin solvent and 1 to 20 parts of dimethylsilicone.

When the wax of the present invention is coated on a textured bumper of low gloss resin, a resin bumper as textured and coated or a resin bumper as coated, a protective wax coat which has a high durability and which does not cause whitening is formed.

The car wax of the present invention may be formulated as an emulsion type or solvent type of composition. If the composition is an emulsion type of wax formulation, water, a surface active agent and polyacrylic acid are additionally mixed with the ingredients. These components are independently known as components of car waxes.

In order to prepare an emulsion type of car wax, 60 to 120 parts of water, 1 to 5 parts of active surface agent, and 0.2 to 0.7 parts of polyacrylic acid are further mixed with the main car waxing ingredients which are a microcrystalline wax and/or a normal paraffin, the contents of which are specified above.

In the wax of the present invention, a microcrystalline wax having a low melting point is used as the main component in order to avoid a whitening effect after application of the wax coating. A hard wax such as carnauba wax is used in conventional waxes. Furthermore, a fatty acid bisamide is added to the composition in order to improve the application properties and the adhesion of the wax to the substrate. Moreover, a normal paraffin and/or isoparaffin solvent which has a grade corresponding to that for cosmetics is added to the composition to minimize attack on the resin. Still further, an acidic wax having a high acid value (acidity being from 3 to 160) may be used when an emulsion type wax is formed.

The car wax of the present invention may be prepared by conventional methods.

With regard to the solvent type of car wax, the components are mixed together while heating up to 90° to 110° C. for an appropriate time are being stirred until a homogeneous molten mixture is obtained. The mixture is then allowed to cool to form the solvent type of wax.

With regard to the emulsion type of car wax, the aqueous components are mixed while heating up to 85° to 95° C. with the oily components while heating up to 90° to 110° C. so that a homogeneous mixture may be obtained. The heated mixture is allowed to cool to form an emulsion type of wax.

The car wax thus obtained can be applied to the exterior surfaces of resin parts in the same or similar manner as conventional car waxes.

The present invention will be further illustrated by certain examples which are provided only for purposes of illustration and are not intended to limit the present invention.

EXAMPLE 1

30 parts of microcrystalline wax having a melting point of 85° C., 5 parts of oleylmethylene-bisamide, 2 parts of acidic wax, 10 parts of dimethylsilicone having a viscosity of 350 cs and 50 parts of isoparaffin having a boiling point of 160° to 200° C. were heated and mixed to form an oily fraction.

Separately, 90 parts of water, 3 parts of morpholine, 0.6 part of oleic acid and 0.5 part of polyacrylic acid were heated and mixed to form an aqueous fraction. The oily fraction was added to the aqueous fraction being stirred, and the mixture was cooled to obtain the intended wax.

EXAMPLE 2

21 parts of microcrystalline wax having a melting point of 75° C., 3 parts of paraffin wax having a melting point of 70° C., 2 parts of oleylmethylene-bisamide, 11 parts of dimethylsilicone having a viscosity of 500 cs and 85 parts of normal paraffin having a boiling point of 100° to 250° C. were heated and mixed, and the mixture was cooled to obtain the intended wax.

The properties of the waxes obtained in Examples 1 and 2, a commercially available emulsion type car wax A (Comparative Example 1) free of an abrasive, a commercially available solvent wax B (Comparative Example 2) and a wax (Comparative Example 3) obtained by coloring the wax of Example 1 were tested by the following tests using polypropylene and polyurethane resin plates.

Wax A (Comparative Example 1): Soft 99-quick one metallic manufactured by Nittoh Chemical Co., Ltd.

Wax B (Comparative Example 2): "Johnson metallic" manufactured by Johnson Co., Ltd.

TEST METHODS (a) Whitening after Coating:

A wax was thinly and uniformly coated on a cleaned surface of a textured black resin plate and was dried at room temperature. The coated surface was lightly wiped with a cloth, and it was visually determined by the naked eye whether the wax left in the depressions looked white relative to the resin substrate or not. The sample in which the whitening was not caused was judged as being excellent.

(b) Ability to hide Scratch Marks:

Deep and shallow scratches were formed on a black resin plate by a knife and a water resisting abrasive paper #200, and it was visually determined by the naked eye whether or not the scratches were made sufficiently inconspicuous. When the scratches were rendered inconspicuous by the wax, the wax was judged as being excellent.

(c) Resistance to Whitening by Water:

Shallow scratches were formed on an uncoated surface of a black smooth resin plate by a water-resistant abrasive paper #600, and a wax was coated on it and dried while being allowed to stand at room temperature for 4 hours. The coated surface was lightly wiped by a cloth and then exposed to showering at 800 mm/hr for 5 hours. It was visually determined by the naked eye whether or not the wax coated on the resin plate was whitened. When the whitening was not caused, the resistance to whitening by water was judged as being excellent.

(d) General-Purpose Property:

A wax was coated on a light grey plate and a silver coated resin plate which are different from a black resin plate in their colors respectively, and the influence of the wax on the appearance was observed. When the appearance was not visibly influenced, the wax was judged to be excellent in the general-purpose property.

ordinary car waxes in the resistance to whitening after coating and other properties and is superior to a colored wax in the general-purpose property.

Accordingly, the wax composition of the present invention is useful for the maintenance and care of automobile bodies.

Having now fully described the invention, it will be apparent to one of ordinary skill in the art that many changes and modifications can be made thereto without departing from the spirit and scope of the invention as set forth herein.

What is claimed is:

1. A wax which is suitable for use on low gloss resin exterior parts of an automobile which comprises:
   a microcrystalline wax having a melting point of 50° to 100° C., or a paraffin wax having a melting point of 40° to 70° C., or a mixture thereof, a fatty acid amide, and isoparaffin or normal paraffin solvent having a boiling point of 100° to 250° C., or a mixture thereof, and dimethylsilicone.

2. The wax of claim 1, which comprises:
   30 to 15 parts by weight of microcrystalline wax, or paraffin wax, or a mixture thereof; 1 to 5 parts by weight of fatty acid amide, 30 to 90 parts by weight of isoparaffin, or normal paraffin solvent or a mixture thereof, and 1 to 20 parts by weight of dimethylsilicone.

3. The wax of claim 1, which comprises:
   21 parts by weight of microcrystalline wax, 3 parts by weight of paraffin wax, 2 parts by weight of paraffin fatty acid methylene-bisamide, 11 parts by weight of 500 cs dimethylsilicone, and 85 parts by weight of normal paraffin.

4. The wax of claim 1, wherein said wax is non-colored.

5. The wax of claim 2, wherein said wax is non-colored.

6. The wax of claim 3, wherein said wax is non-colored.

7. The wax of claim 1, wherein said fatty acid amide is a fatty acid methylene-bisamide.

8. The wax of claim 1, wherein said fatty acid amide is oleylmethylene-bisamide.

9. A process for producing an emulsion wax which is suitable for use on low gloss resin exterior parts of an automobile, comprising heating and mixing the com-

TABLE

| TEST ITEM | Example 1 (Emulsion Type) | Example 2 (Solvent Type) | Comparative Example 1 (Emulsion Type) | Comparative Example 2 (Solvent Type) | Comparative Example 3 (Colored Wax of Example 1) |
|---|---|---|---|---|---|
| Whitening after coating | excellent | excellent | insufficient | bad | excellent |
| Hiding power to scratches | good to insufficient | good to insufficient | insufficient to bad | bad | excellent |
| Resistance to whitening by water | excellent | excellent | bad | bad | excellent |
| General-purpose property | excellent | excellent | not examined | not examined | bad |

As is apparent from the foregoing test results, when the non-colored wax of the present invention is coated on a black textured resin, although the scratch hiding power is somewhat inferior to that of a black-colored wax, the wax of the present invention is comparable or superior to the black-colored wax in other properties.

As is apparent from the foregoing description, the wax of the present invention is excellent as compared to pounds of claim 1, into an oily fraction and adding to said mixture an aqueous fraction comprising 90 parts by weight of water, 3 parts by weight of morpholine, 0.6 parts by weight of oleic acid and 0.5 parts by weight of polyacrylic acid, forming an emulsion therefrom and cooling said emulsion.

10. A process as in claim 9 wherein said bearing comprises heating said mixed compounds of claim 1 to a temperature in the range of 85° C. to 95° C., thereby forming a homogenous mixture of said compounds.

11. A process for producing a solvent wax which is suitable for use on low gloss resin exterior parts of an automobile, comprising heating and mixing the compounds of claim 1, forming a homogenous molten mixture, and cooling said homogenous molten mixture.

12. A process as in claim 11, wherein said heating comprises heating said mixed compounds of claim 1 to a temperature in the range of 90° C. to 110° C., thereby forming a homogenous molten mixture of said compounds.

* * * * *